United States Patent [19]

Van Lengerich et al.

[11] Patent Number: 5,015,488

[45] Date of Patent: May 14, 1991

[54] COOKIE PRODUCTION WITH EXTRUSION HEAT TREATMENT AND POST EXTRUSION MIXING AND BAKING

[75] Inventors: Bernhard Van Lengerich, Ringwood; Cathryn C. Warren, Ridgewood, both of N.J.

[73] Assignee: Nabisco Brands, Inc., East Hanover, N.J.

[21] Appl. No.: 362,472

[22] Filed: Jun. 7, 1989

[51] Int. Cl.$^5$ ................................................ A21D 8/00
[52] U.S. Cl. ...................................... 426/549; 426/94; 426/283; 426/518
[58] Field of Search ................. 426/549, 551, 94, 283, 426/518

[56] References Cited

U.S. PATENT DOCUMENTS

| | | | |
|---|---|---|---|
| 1,625,022 | 4/1927 | Fousek . | |
| 2,120,138 | 6/1938 | Mathews et al. | 99/81 |
| 2,183,693 | 12/1939 | Rasch | 107/14 |
| 2,488,046 | 11/1949 | Werner et al. | 107/29 |
| 2,582,542 | 1/1952 | Hein | 107/29 |
| 2,838,012 | 6/1958 | Weidenmiller et al. | 107/29 |
| 2,838,013 | 6/1958 | Weidenmiller et al. | 107/29 |
| 3,021,220 | 2/1962 | Going et al. | 99/92 |
| 3,064,589 | 11/1962 | Genich | 107/29 |
| 3,158,486 | 11/1964 | Mork et al. | 99/86 |
| 3,195,868 | 7/1965 | Loomans et al. | 259/104 |
| 3,215,094 | 11/1965 | Oldershaw et al. | 107/54 |
| 3,275,449 | 9/1966 | Fritzberg | 99/80 |
| 3,393,074 | 7/1968 | Ehrlich | 99/92 |
| 3,424,590 | 1/1969 | Booras | 99/70 |
| 3,458,321 | 7/1969 | Reinhart | 99/80 |
| 3,462,276 | 8/1969 | Benson | 99/81 |
| 3,480,445 | 11/1969 | Slaybaugh | 99/83 |
| 3,482,992 | 12/1969 | Benson | 99/81 |
| 3,490,750 | 1/1970 | Brennan | 259/104 |
| 3,492,127 | 1/1970 | Ketch et al. | 99/86 |
| 3,615,675 | 10/1971 | Wisdom | 99/83 |
| 3,682,652 | 8/1972 | Corbin et al. | 99/83 |

(List continued on next page.)

OTHER PUBLICATIONS

Anderson et al., "Gelatinization of Corn Grits by Roll Cooking Extrusion Cooking and Steaming", *Die Strake* 22, Jahg. Nr. 4, pp. 130–134.

Anderson et al., "The Terminology and Methodology Associated with Basic Starch Phenomena", *Cereal Foods World*, vol. 33, No. 3, p. 306 (Mar. 1988).

Atwell et al., "The Terminology and Methodology Associated with Basic Starch Phenomena", *Cereal Foods World*, vol. 33, No. 3, p. 306 (Mar. 1988).

Continuous Twin-Screw Processing-Future Oriented Technology, Werner & Pfleiderer Corporation, 663 East Cresent Avenue, Ransey, N.J. (Undated).

*Koch-Und Extrudier-Techniken*, "Biscuits", Internationales Susswaren-Institut (1982).

Leung et al, "Storage Stability of a Puff Pastry Dough With Reduced Water Activity", *J. Food Science*, vol. 49, No. 6, p. 1405 (Nov.-Dec. 1984).

Lorenz et al, "Baking With Microwave Energy", *Food Technology*, pp. 28–36 (Dec. 1973).

Mercier et al, *Extrusion Cooking*, pp. 347–353, and 404–415 (1989).

Nestl, Birgit, Doctoral Thesis, Entitled, "Formula and Process Optimization for the Extrusion of Baked Goods Under Particular Consideration of Various Lipids and Sweeteners (Dietetic Products and Products with Different Nutritional Value)" Justus–Liebig University of Giessen, Giessen, W. Germany (Filed Mar. 1989).

Processing: Extruded Snacks, Werner and Pfleiderer, GmbH, Postpach 30, 1220 Theodorstrasse 10 7000, Stuttgart 30, West Germany (undated).

(List continued on next page.)

FOREIGN PATENT DOCUMENTS

| | | |
|---|---|---|
| 1247926 | 1/1989 | Canada ............................... 99/113 |
| 0052046 | 5/1982 | European Pat. Off. . |
| 0098642 | 1/1984 | European Pat. Off. . |
| 102232 | 3/1984 | European Pat. Off. . |
| 0134322 | 3/1985 | European Pat. Off. . |
| 0145550 | 6/1985 | European Pat. Off. . |
| 0213007 | 3/1987 | European Pat. Off. . |
| 0251375 | 1/1988 | European Pat. Off. . |
| 252270 | 1/1988 | European Pat. Off. . |
| 0252270 | 1/1988 | European Pat. Off. . |
| 0266958 | 5/1988 | European Pat. Off. . |
| 0275878 | 7/1988 | European Pat. Off. . |
| 0296039 | 12/1988 | European Pat. Off. . |
| 3238791 | 4/1984 | Fed. Rep. of Germany . |

(List continued on next page.)

*Primary Examiner*—Donald E. Czaja
*Assistant Examiner*—Mary S. Mims

[57] ABSTRACT

The present invention relates to the production of cookies which exhibit a cookie crumb-like structure and structural integrity using a cooker extruder to mix and heat ingredients comprising flour and oil to promote browning and flavor development. The heat treated mass produced in the cooker extruder is admixed with ingredients comprising water in a post extrusion mixer. The dough-like mixture produced in the post extrusion mixer is leavened and further browned using post-extrusion baking, such as microwave, dielectric radio frequency, infrared, conductive, or convection baking, frying, or a combination thereof. The shorting or fat content of the dough-like mixture may be from about 12% by weight to about 40% by weight, preferably from about 20% by weight to about 30% by weight, based upon the weight of the dough-like mixture. Separation of oil from the remaining mass and extruder surging and starch gelatinization are avoided preferably by admixing water into heat-treated ingredients comprising flour and oil after and during substantial cooling of the heat-treated ingredients. The extruder and post extrusion mixer are operated at low pressures, generally less than about 20 bars absolute, preferably less than about 10 bars absolute. The relative amount of solid, crystalline or granulated sugar, such as sucrose, subjected to the heat treatment may be used to control the tenderness and crunchiness of the final product.

34 Claims, No Drawings

U.S. PATENT DOCUMENTS

| | | | |
|---|---|---|---|
| 3,692,535 | 9/1972 | Norsby | 99/92 |
| 3,732,109 | 5/1973 | Poat et al. | 99/83 |
| 3,753,729 | 8/1973 | Harms et al. | 99/82 |
| 3,767,421 | 10/1973 | Gulstad et al. | 426/153 |
| 3,767,422 | 10/1973 | Levitz | 426/152 |
| 3,769,034 | 10/1973 | Dreier, Jr. et al. | 426/151 |
| 3,861,287 | 1/1975 | Manser | 99/348 |
| 3,907,025 | 9/1975 | Miller et al. | 426/623 |
| 3,922,369 | 11/1975 | Glicksman et al. | 426/548 |
| 3,987,207 | 10/1976 | Spaeti et al. | 426/99 |
| 4,020,187 | 4/1977 | McCulloch et al. | 426/72 |
| 4,038,481 | 7/1977 | Antrim et al. | 536/56 |
| 4,039,168 | 8/1977 | Caris et al. | 259/9 |
| 4,044,159 | 8/1977 | Lutz | 426/302 |
| 4,044,661 | 8/1977 | Balaz | 99/355 |
| 4,099,455 | 7/1978 | Wenger et al. | 99/450.1 |
| 4,104,463 | 8/1978 | Antrim et al. | 536/56 |
| 4,126,710 | 11/1978 | Jaworshi et al. | 426/589 |
| 4,128,051 | 12/1978 | Hildebolt | 99/348 |
| 4,190,410 | 2/1980 | Rhodes | 425/239 |
| 4,217,083 | 8/1980 | Machuque | 425/198 |
| 4,218,480 | 8/1980 | Dyson et al. | 426/19 |
| 4,219,580 | 8/1980 | Torres | 426/549 |
| 4,225,630 | 9/1980 | Pitchon | 426/623 |
| 4,239,906 | 12/1980 | Antrim et al. | 536/56 |
| 4,245,552 | 1/1981 | Small et al. | 99/483 |
| 4,251,551 | 2/1981 | VanHulle | 426/94 |
| 4,277,464 | 7/1981 | Reussner et al. | 424/177 |
| 4,285,271 | 8/1981 | Falk et al. | 99/348 |
| 4,318,931 | 3/1982 | Schiffman et al. | 426/243 |
| 4,322,202 | 3/1982 | Martinez | 425/208 |
| 4,344,975 | 8/1982 | Seiler | 426/285 |
| 4,350,713 | 9/1982 | Dyson et al. | 426/243 |
| 4,379,171 | 4/1983 | Furda et al. | 426/291 |
| 4,394,395 | 7/1983 | Rostagno et al. | 426/265 |
| 4,418,088 | 11/1983 | Cantenot | 426/549 |
| 4,431,674 | 2/1984 | Fulger et al. | 426/18 |
| 4,438,146 | 3/1984 | Colby et al. | 426/448 |
| 4,454,804 | 7/1984 | McCulloch | 99/348 |
| 4,455,333 | 6/1984 | Hong et al. | 426/94 |
| 4,465,447 | 8/1984 | Cheigh et al. | 425/72 |
| 4,465,452 | 8/1984 | Masuzawa | 425/308 |
| 4,478,857 | 10/1984 | Stauss | 426/72 |
| 4,492,250 | 1/1985 | Levine | 425/142 |
| 4,497,850 | 2/1985 | Gould et al. | 426/560 |
| 4,500,558 | 2/1985 | Fulger et al. | 426/463 |
| 4,503,080 | 3/1985 | Brabbs et al. | 426/94 |
| 4,563,358 | 1/1986 | Mercer et al. | 426/89 |
| 4,568,550 | 2/1986 | Fulger et al. | 426/19 |
| 4,568,551 | 2/1986 | Seewi et al. | 426/99 |
| 4,608,261 | 8/1986 | MacKenzie | 426/242 |
| 4,618,499 | 10/1986 | Wainwright | 426/283 |
| 4,650,685 | 3/1987 | Persson et al. | 426/285 |
| 4,661,360 | 4/1987 | Smith | 426/94 |
| 4,664,921 | 5/1987 | Seiden | 426/94 |
| 4,668,519 | 5/1987 | Dartey et al. | 426/548 |
| 4,685,878 | 8/1987 | Pinto | 425/202 |
| 4,693,899 | 9/1987 | Hong et al. | 426/94 |
| 4,741,264 | 5/1988 | McPeak | 99/483 |
| 4,752,484 | 6/1988 | Pflaumer et al. | 426/94 |
| 4,756,921 | 7/1988 | Calandro et al. | 426/560 |
| 4,762,723 | 8/1988 | Strong | 426/283 |
| 4,764,388 | 8/1988 | Sullivan et al. | 426/311 |
| 4,770,890 | 9/1988 | Giddey et al. | 426/549 |
| 4,771,915 | 9/1988 | Cand et al. | 222/56 |
| 4,777,057 | 10/1988 | Sugisawa et al. | 426/412 |
| 4,778,690 | 10/1988 | Sadel, Jr. et al. | 426/560 |
| 4,786,514 | 11/1988 | Wiedmann | 426/231 |
| 4,828,853 | 5/1989 | Banks et al. | 426/94 |
| 4,844,937 | 7/1989 | Wilkinson et al. | 426/559 |
| 4,844,938 | 7/1989 | Amamoto et al. | 426/589 |
| 4,851,247 | 7/1989 | Greenhouse et al. | 426/250 |
| 4,892,471 | 1/1990 | Baker et al. | 425/132 |
| 4,911,939 | 3/1990 | Lou et al. | 426/241 |
| 4,948,611 | 8/1990 | Cummins | 426/503 |
| 4,948,612 | 8/1990 | Keller et al. | 426/549 |

FOREIGN PATENT DOCUMENTS

| | | |
|---|---|---|
| 2602398 | 2/1988 | France . |
| 0173040 | 1/1984 | Japan . |
| 0241841 | 11/1985 | Japan . |
| 291249 | 8/1985 | Netherlands . |
| 0558141 | 12/1943 | United Kingdom . |
| 1175595 | 12/1969 | United Kingdom . |
| 1254562 | 11/1971 | United Kingdom . |
| 1471108 | 4/1977 | United Kingdom . |
| 1561190 | 2/1980 | United Kingdom . |
| 2131670 | 6/1984 | United Kingdom . |
| 2132868 | 7/1984 | United Kingdom . |
| 2136666 | 9/1984 | United Kingdom . |
| 8606938 | 12/1986 | World Int. Prop. O. . |

OTHER PUBLICATIONS

Rossen et al, "Food Extrusion", *Food Technology*, pp. 46–53 (Aug. 1973).

Sanderude, K., "Continuous Cooking Extrusion: Benefits to the Snack Food Industry", *Cereal Science Today*, vol. 14, No. 6, pp. 209–210 and 214, (Jun. 1969).

Unique Cooker Extruder, Food Engineering Intl., pp. 41–43 (May 1983).

Woollen, A., "Higher Productivity in Crispbread", *Cereal Foods World*, vol. 30, No. 5, pp. 333–334 (May 1985).

COOKIE PRODUCTION WITH EXTRUSION HEAT TREATMENT AND POST EXTRUSION MIXING AND BAKING

FIELD OF THE INVENTION

The present invention relates to the production of cookies having a crumb-like structure using extrusion heat treatment and post extrusion mixing and baking.

BACKGROUND OF THE INVENTION

In the production of a high oil content farinaceous composition by extrusion cooking, mobility and immiscibility of the water and oil phases generally increase with increasing temperature. Additionally, the mechanical action of extruder screws tends to increase separation of oil from the remaining mass. The tendency for the oil to separate is at locations within the extruder at which the components are subjected to the highest pressure. Exemplary of high pressure locations in a twin screw extruder are: (1) the space between the extruder screw tips and the die orifice, and (2) the narrowest or more restricted passageways between the left and right hand screw elements.

Oil separation under system pressure (screw or die pressure) can be manifested in extruder surging or uneven mass flow rates from the die. Upon extrusion from the die, separated oil may: (1) appear as a coating on the remaining dough mass, or (2) periodically discharge separately from the remaining dough mass. Non-homogeneous dough production and discontinuous extruder operation may thus result from oil separation. The problem of oil separation increases with increasing oil levels.

Water separation from flour, up to the boiling point of water, is generally not a problem because of the more hydrophilic properties of flour components such as gluten and starch. As flour and water temperatures are raised, increased migration of water into starch granules, protein (e.g. gluten) denaturization, and starch gelatinization tend to occur. The binding or reaction of water with flour components may promote separation of oil: (a) by making the flour components more polar or hydrophilic and (b) by creating a greater mass of hydrophilic components.

Conventional cookie production involves forming cookie dough preforms or pieces followed by baking of the pieces. Low temperatures, typically at about room temperature, are used to form the dough. The low temperature mixing generally avoids separation of shortening or fat from hydrophilic dough components. While baking temperatures in a conventional oven, such as a band oven, may promote oil separation, there is no mixing or pressing action performed at the baking temperatures. Any oil separation which may occur in such ovens does not generally interfere with continuous operability of the cookie production process as it would in a continuous cooker/extruder process.

In addition to high temperature mixing and high system pressure, the presence of sugar in a cookie dough may also increase oil and water separation. Solubilization of sugars in water increases the relative amount of the hydrophilic mass. This in turn may tend to promote oil separation.

In the process of the present invention, cookie products are produced using an extrusion cooker to promote Maillard browning and flavor development without the problems caused by the separation of oil from the remaining cookie dough mass. The extruded cookies or cookie-like products of the present invention have a cookie crumb or crumb-like structure and texture and exhibit structural integrity.

SUMMARY OF THE INVENTION

The present invention provides a continuous process for the production of cookies which exhibit a cookie crumb-like structure and structural integrity using a cooker extruder, post extrusion mixing, and post extrusion heating, such as dielectric radio frequency baking, microwave baking, conductive baking, hot air baking, infra red heating, frying or combinations thereof.

The use of substantially the entire maximum available length of the extruder to heat treat ingredients comprising shortening or fat, flour and optionally, at least one texturizing ingredient such as sugar, permits significant production of browning and flavor components. It further substantially reduces the amount of post extrusion heat treatment required for final baking of the output product. Also, thermal stress on the extruder screws may be reduced by maintaining a more even temperature profile in the extruder.

A cookie crumb-like structure is achieved by avoiding substantial starch gelatinization. Preferably, the starch carrying ingredients are coated with the oil, and then water is added to the hot flour and oil mass during and/or after heat treatment. Using an amount of water such that the water content of the dough-like mixture is sufficiently low so as to avoid substantial starch gelatinization further assures that no or substantially no starch gelatinization occurs. The use of low water contents also tends to reduce oil separation from hydrophilic cookie dough components at elevated temperatures.

In embodiments of the present invention the ingredients are heated in the cooker extruder to a high temperature, for example at least about 150° F., to reduce post extrusion baking time, and promote Maillard browning and flavor development. Preferably, the ingredients are heated to a temperature of at least about 200° F., more preferably at least about 250° F., most preferably from about 300° F. to about 500° F., to obtain a heat-treated mass. The heat treated mass is formed at a relatively low pressure within the cooker extruder, generally less than about 20 bars absolute, preferably less than about 10 bars absolute.

In embodiments of the present invention, the heat treated mass is cooled and admixed at low pressures with liquid water or a source of water and optional sugar in a post extrusion or second stage mixing device to obtain a substantially homogeneous dough-like mixture. Post extrusion mixing devices which may be used include a continuous mixer or a second stage extruder or combinations thereof. The heat treated mass is cooled to a sufficiently low temperature so that upon its encountering of points of high pressure, the added water does not cause substantial oil separation and extruder surging. Cooling of the heat treated mass is preferably initiated prior to and continues after addition of the water. The temperature of the dough-like mixture which is formed is most preferably less than about 150° F. but above about 100° F. at the exit end of the post extrusion mixer.

Preferably, the heat treated mass temperature upon addition of or during admixing with water or a liquid source of water in the cooker extruder and/or in the post extrusion mixer is from about 100° F. to about 300° F., more preferably from about 110° F. to about 212° F.

If the heat treated mass temperature is too low, viscosity may deleteriously increase, mixing may be more difficult, pressure may increase and substantial oil separation or surging may occur. Also, higher temperatures in the cooker extruder and/or in the post extrusion mixing device reduce post extrusion heating times.

The added shortening or fat content of the dough-like mixture may, for example, be from about 12% by Weight to about 40% by weight, preferably from about 20% by weight to about 30% by weight, based upon the weight of the dough-like mixture.

The elimination or significant reduction of added water or a source of added water in a cooker extruder or post extrusion mixer tends to reduce oil separation from hydrophilic cookie dough components at elevated temperatures. It also reduces post extrusion heating time. However, added water or a source of water is needed in cookie production for formability or machinability of cookie doughs into sheets or pieces at high production rates. Water also helps to disperse cookie ingredients and to promote flavor and color development.

In the present invention, preferably the amount of water added is less than the amount needed to reach a threshold or maximum consistency. In preferred embodiments of the present invention, the amount of water added to the heat treated mass may range from about 0.5% by weight to about 10% by weight, based upon the weight of the dough-like mixture. It may, for example, be from about 2% by weight to about 6% by weight, based upon the weight of the dough-like mixture, depending upon the heat treatment temperatures and the desired consistency for shaping or forming.

The water content of the dough-like mixture is preferably as low as possible to reduce post extrusion heating time and to reduce the risk of substantial oil separation and extruder surging. It is generally less than about 20% by weight, preferably less than about 15% by weight, more preferably less than about 10% by weight, based upon the weight of the dough-like mixture.

Process compatible ingredients can be added to adjust the texture of the products produced by the process of the present invention. For example, the relative amount of at least one solid, crystalline, or granulated sugar, such as sucrose, which is subjected to the heat treatment can be used to control the tenderness and crunchiness of the final product. Addition of a solid, or crystalline or granulated sugar, such as sucrose, and subjecting it to high extrusion temperatures tends to melt and/or dissolve the sugar crystals and thus promote a crunchy texture in the final product. Addition of all or a portion of the solid sugar to the cooled mass rather than subjecting it to high extrusion temperatures tends to avoid sugar melting and/or dissolution, and promotes a tender texture in the final product. In embodiments of this invention the sugar component may be added in an amount to provide, for example, from about 10% by weight to about 40% by weight, preferably from about 20% by weight to about 30% by weight total sugar solids, based upon the total weight of the dough-like mixture. Crystalline or granulated sucrose alone or used with other sugars is preferred.

Dough-like mixtures of the present invention are extrudable through a die into a continuous rope or sheet. The pressure drop upon extrusion or across the extruder die is generally less than about 20 bars absolute, preferably less than about 10 bars absolute. The work done in producing the heat treated mass or the dough-like mixture, defined as the specific mechanical energy is generally low, for example less than about 40 watt-hrs/kg (or 18 watt-hrs/lb). Preferably, substantial frictional heating does not occur in the cooker extruder with substantially all of the heating being provided by external or jacketed heaters.

Puffing or expansion due to moisture or steam release upon exiting of the dough-like mass from the post extrusion mixer typically does not occur. The post extrusion mixer extrudate is formed into pieces and the pieces are leavened and further browned by subjecting them to at least one other heating source, such as a microwave oven, infrared oven, convection oven, dielectric radio frequency oven, a fryer, or conductive heater, to obtain cookie products which exhibit structural integrity and a crumb-like structure and texture. Generally, the volume increase upon post extrusion heating ranges from about 20% to about 200%.

Leavening agents are optional and may be included in amounts up to about 5% by weight, based upon the weight of the dough-like mixture. Dough-like mixtures of the present invention having a shelf-stable water activity of less than about 0.7, preferably less than about 0.6 may be packaged as shelf stable products in moisture and oxygen impermeable packaging materials for subsequent leavening and browning in conventional home microwave or convection ovens.

DETAILED DESCRIPTION OF THE INVENTION

In the present invention cookies are continuously produced using an extrusion cooker to continuously mix ingredients, to reduce post extrusion heating time, and to promote browning and flavor development. In preferred embodiments of the present invention, the heat treated mass continuously produced in the extrusion cooker is extruded and transferred to a post extrusion or second stage mixer, where it is cooled and admixed with ingredients comprising water to form a dough-like mixture. The dough-like mixture continuously produced in the post extrusion mixer is leavened using at least one other energy source to obtain baked goods having a crumb-like structure or cookie crumb. The post extrusion leavening may be by microwave energy, dielectric radio frequency energy, infrared energy, conductive heating, frying, or heated air, such as from a convection oven or fluidized bed heater. In addition to leavening the composition, the post extrusion heating further browns the dough-like mixture.

Separation of oil from the remaining mass and extruder surging are avoided preferably by admixing water into heat-treated ingredients comprising flour and oil which are at a temperature of about 100° F. to about 300° F., more preferably from about 110° F. to about 212° F. In embodiments of the present invention, water addition may be after and/or during substantial cooling of the heat treated ingredients. After the cooling of the heat treated ingredients, the post extrusion heating leavens the substantially unleavened extrudate. The volume increase resulting from the post extrusion heating or leavening step generally ranges from about 20% to about 200%, based upon the volume of the extrudate.

The flour component may be any comminuted cereal grain or edible seed meal, derivatives thereof and mixtures thereof. Exemplary of the flour components which may be used are wheat flour, corn flour, oat flour, barley flour, rye flour, rice flour, potato flour, grain sorghum flour, corn starch, physically and/or chemically modified flours or starches, such as pregelatinized starches, and mixtures thereof. The flour may be bleached or unbleached. Wheat flour or mixtures of wheat flour with other grain flours are preferred. The amount of flour used in the compositions of the present invention ranges, for example, from about 30% by weight to about 70% by weight, preferably from about 45% by weight to about 55% by weight. Unless otherwise indicated, all weight percentages are based upon the total weight of all ingredients forming the dough-like mixtures or formulations of the present invention except for inclusions such as flavor chips, nuts, raisins, and the like. Thus, "the weight of the dough-like mixture" does not include the weight of inclusions.

The flour may be replaced in whole or in part by flour substitutes or bulking agents such as, polydextrose, hollocellulose, microcrystalline cellulose, mixtures thereof, and the like. Corn bran, wheat bran, oat bran, rice bran, mixtures thereof, and the like, may also be substituted in whole or in part for the flour for making a fiber enriched product, to enhance color, or to affect texture.

Corn flour and/or wheat bran may be used, for example, to enhance color and affect texture. Exemplary amounts range up to about 15% by weight corn flour and up to about 20% by weight wheat bran, the percentages being based on the total weight of ingredients forming the dough-like mixture. Preferably, the corn flour and wheat bran will each comprise from about 1 to about 10% by weight, more preferably from about 2% by weight to about 5% by weight, based upon the weight of the dough-like mixture.

The shortening or fat used in the present invention may be any edible fat or oil or mixture thereof suitable for baking applications and may include conventional food-grade emulsifiers. Vegetable oils, lard, marine oils, and mixtures thereof which are fractionated, partially hydrogenated, and/or interesterified are exemplary of the shortenings or fats which may be used in the present invention. Edible reduced or low calorie, or non-digestible fats, fat substitutes, or synthetic fats, such as sucrose polyesters which are process compatible may also be used. The shortenings or fats may be solid or fluid at room temperatures of from about 75° F. to about 90° F. The use of components which are solid or semi-solid at room temperatures are preferred so as to avoid possible oil seepage from the final product during storage. The shortening or fat component is preferably added to the extruder in the form of a heated oil to facilitate metering, mixing, and a fast heat up of the added ingredients.

Generally, the amount of the shortening or fat component admixed with the flour component is, for example, at least about 12% by weight, and may, for example, go up to about 40% by weight, based upon the weight of the dough-like mixture. It preferably ranges from about 20% by weight to about 30% by weight, based upon the weight of the dough-like mixture.

Exemplary emulsifiers which can be used include lecithin, sorbitan monostearate, mono- and/or diglycerides, polyoxyethylene sorbitan fatty acid esters, such as polysorbates (e.g., polyoxyethylene (20) sorbitan monostearate), and sodium stearoyl-2-lactate. Exemplary amounts are up to about 3% by weight of one or more emulsifiers based upon the weight of the flour.

Process compatible ingredients which can be used to modify the texture of the products produced in the present invention include sugars such as sucrose, fructose, lactose, dextrose, galactose, maltodextrins, corn syrup solids, hydrogenated starch hydrolysates, protein hydrolysates, mixtures thereof, and the like. Reducing sugars, such as fructose, maltose, lactose, and dextrose or mixtures of reducing sugars may be used to promote browning. Fructose is the preferred reducing sugar, because of its ready availability and its generally more enhanced browning and flavor development effects. Exemplary sources of fructose include invert syrup, corn syrup, high fructose corn syrup, molasses, brown sugar, maple syrup, mixtures thereof, and the like.

The texturizing ingredient, such as sugar may be admixed with the other ingredients in either solid or crystalline form, such as crystalline or granulated sucrose, granulated brown sugar, or crystalline fructose, or in liquid form, such as sucrose syrup or high fructose corn syrup. Humectant sugars, such as high fructose corn syrup, may be used to promote chewiness in the post-extrusion baked product.

In embodiments of the present invention, the total sugar solids content, or the texturizing ingredient content, of the dough-like mixtures of the present invention is, for example, at least about 10% by weight, and may, for example, go up to about 40% by weight, based upon the weight of the dough-like mixture. It preferably ranges from about 20% by weight to about 30% by weight, based upon the weight of the dough-like mixture.

Crystalline or granulated sucrose alone or with other sugars is preferred in the present invention. The sucrose content may, for example, be at least about 80% by weight, based upon the total sugar solids content of the dough-like mixture. The balance of the sugar solids may comprise fructose, dextrose, lactose, or mixtures thereof, for example. Sugar granulations which may be used range, for example, from about 4× to about 12×.

The moisture contents of the dough-like mixtures of the present invention should be sufficient to provide the desired consistency to enable proper forming, machining, and cutting of the dough. The total moisture content of the dough-like compositions of the present invention will include any water included as a separately added ingredient, as well as the moisture provided by flour (which usually contains about 12% to about 14% by weight moisture), and the moisture content of other dough additives included in the formulation, such as high fructose corn syrup, invert syrups, or other liquid humectants.

Taking into account all sources of moisture in the dough-like mixture including separately added water, the total moisture content of the dough-like mixtures of the present invention is generally less than about 20% by weight, preferably less than about 15% by weight, more preferably less than about 10% by weight, based upon the weight of the dough-like mixture. The dough-like compositions of the present invention generally have a water or moisture content of at least about 5% by weight, based upon the weight of the dough-like composition.

Generally, if the amount of added water is too low, the extrudate will tend to be slurry-like and cannot be cut into pieces. As the amount of water is increased the extrudate consistency increases, until a threshold level is reached. At this level, additional water reduces the consistency. However, as the amount of water is increased to reduce the consistency, there is an increased risk of substantial oil separation and extruder surging. The lower the pressure and/or temperature to which the heat treated mass is subjected to after water addition: the lower is the risk. Thus, adding an extrusion die to the extruder or to the post extrusion mixer: (a) increases the pressures encountered by the ingredients in the extruder or post extrusion mixer which, (b) increases the risk that the addition of water beyond the amount needed to reach the threshold level of consistency will result in oil separation which can reduce machinability.

The consistency of the extrudate can be determined by measuring the force needed to penetrate a sample at a constant rate of penetration. An Instron Texture Analyzer Model 4202 can be used to determine the modulus of the sample, which is a measurement of the consistency of the sample. The modulus is the slope, in the linear region, of a plot of the strain or deformation (x-axis) versus the stress (y-axis). The strain can be measured in inches and the stress can be measured in lbs force. A cylindrical shaped probe having a diameter of 4 mm can be used for the measurement of the consistency. The probe can be set to penetrate the sample at a constant speed of 0.2 inches/min. The sample dimensions can be about 1 inch square and $\frac{1}{4}$ inch high, or thick. The sample temperature can be room temperature (about 70°-75° F.) or higher. The more force required to penetrate the sample, the greater is its modulus and the greater is its consistency.

Consistencies suitable for forming or cutting operations depend upon the particular operation and particular equipment utilized. For example, a consistency which is too high for wire cutting may be suitable for sheeting or rotary molding. For rotary molding, the consistency at about the threshold level is suitable. For extrusion through a die, for producing a sheet for example, or for wire cutting, the consistency should be less than the threshold value. However, to reduce the risk of substantial oil separation in the extruder, the post extrusion mixer, or in post extrusion forming operations and to reduce post extrusion baking times, it is generally preferred that the amount of water added be less than the amount needed to reach the threshold or maximum consistency. Thus, it is generally preferred that the water content of the dough-like mixture is such that additional water will increase the consistency of the dough-like mixture.

If the ratios of the amounts of the other ingredients are kept constant then: the amount of water added which is needed to reach the threshold level of consistency will depend upon the heat treatment of the ingredients. Generally, the longer the heating, or the higher the temperature of heating, the lower is the amount of water needed to reach the threshold level of consistency.

In preferred embodiments of the present invention, the amount of water admixed with the heat treated mass may range, for example, from about 0.5% by weight to about 10% by weight, based upon the weight of the dough-like mixture. Depending upon the time and intensity of heat treatment and the consistency needed for shaping or forming, and the pressures involved, it may be more preferably from about 2% by weight to about 6% by weight, based upon the weight of the dough-like mixture.

The added water may be in the form of pure or tap water, a liquid source of water, such as sucrose syrup, corn syrup, high fructose corn syrup, eggs, honey, molasses, mixtures thereof, and the like, alone or in combination with a dry source of water, such as the moisture content of dried eggs, corn syrup solids, and the like.

Water, in the form of tap water or a liquid source of water, such as high fructose corn syrup, for example, may also be added in the heat treating stage. It may be added with the flour for example, in low amounts (e.g. less than about 2% by weight, based upon the weight of the dough-like mixture) which do not result in: (a) substantial oil separation or extruder surging or, (b) substantial starch gelatinization.

In addition to the foregoing, the dough-like mixtures of the invention may include other additives conventionally employed in cookies. Such additives may include, for example, milk by-products, egg or egg by-products, cocoa, vanilla or other flavorings, as well as inclusions such as nuts, raisins, coconut, flavored chips such as chocolate chips, butterscotch chips and caramel chips, and the like.

A source of protein which is suitable for inclusion in baked goods may be included in the dough-like compositions of the present invention to promote Maillard browning. The source of protein includes non-fat dry milk solids, dried or powdered eggs, mixtures thereof, and the like. The amount of the proteinaceous source may, for example, range up to about 5% by weight, based upon the weight of the dough-like mixture.

The dough-like cookie compositions of the present invention may contain up to about 5% by weight of a leavening system, based upon the weight of the dough-like mixture. Chemical leavening agents or injected gases such as carbon dioxide can be used, but are not necessary for leavening the dough-like compositions of the present invention. Leavening action may be achieved by post extrusion heating of the composition which is sufficient to vaporize water in the dough-like cookie composition. However, the leavening agents may be used to adjust or control the degree of leavening and/or to control the pH of the cookie products.

The inclusion of a leavening agent or other edible pH-adjusting agents may promote browning of the cookie mixture during processing within the extruder or during post-extrusion mixing and heating. A desired pH for the cookies or the dough-like mass is from about 5 to about 9.5, preferably from about 7 to 8.5. Generally, the more alkaline the composition, the greater the degree of browning. However, the pH should be adjusted so as not to adversely affect taste of the final product. A higher pH may be used to promote browning when forming the heat treated mass of the present invention, followed by adjustment of the pH after and/or during cooling of the heat treated mass. Exemplary of chemical leavening agents or pH adjusting agents which may be used include alkaline materials and acidic materials such as sodium bicarbonate, ammonium bicarbonate, sodium acid pyrophosphate, tartaric acid, mixtures thereof, and the like.

In the process of the present invention, the flour component and shortening or fat are continuously and separately fed into the upstream portion of a cooker extruder. One or more crystalline or granulated sugars may be continuously added or preblended with the flour. However, continuous separate addition of the crystalline sugar to the upstream end of the extruder is preferred to avoid particle separation in the dry blend. The flour component, the shortening or fat, and the sugar components are generally initially conveyed in the extruder with cooling or without the application of external heat. They are conveyed and admixed while being heated to obtain a heat treated mass.

In the present invention, the ingredients may be heated to temperatures above the minimum gelatinization temperature of the starch (assuming that a sufficient amount of water was available for reaction with the lo starch) but no or substantially no gelatinization (measured by differential scanning calorimetry) occurs. It is desireable that the oil sufficiently coats the starch containing flour particles to prevent substantial penetration of moisture into the starch granules so as to avoid substantial gelatinization.

A cookie crumb-like structure is obtained by avoiding substantial starch gelatinization. Generally, starch gelatinization occurs when: (a) water in a sufficient amount, generally at least about 30% by weight, based upon the weight of the starch, is added to and mixed with starch and, (b) the temperature of the starch is raised to at least about 80° C. (176° F.), preferably 100° C. (212° F.) or more. The gelatinization temperature may depend upon the amount of water available for reaction with the starch. The lower the amount of available water, generally, the higher the gelatinization temperature. Gelatinization may be defined as the collapse (disruption) of molecular orders within the starch granule manifested in irreversible changes in property such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al, "The Terminology And Methodology Associated With Basic Starch Phenomenon," *Cereal Foods World*, Vol. 33, No. 3, Pgs. 306-311 (March 1988).

In the present invention, conditions under which no or substantially no gelatinization is preferably achieved are by embedding or coating the starch carrying ingredients, such as wheat flour, within the oil and then adding the water to the flour and oil mass. No or substantially no gelatinization may also be further assured by: (a) reducing or substantially eliminating the addition of water, and/or (b) admixing the water with the heat treated mass below the minimum temperature at which starch gelatinization can occur.

In the process of the present invention, heating of the flour, shortening or fat, and sugar at as high a temperature as possible and for as long as possible for a maximum throughput rate without burning or other deleterious effects, is generally desirable for the development of browning and flavor. Maillard browning and flavor development involve the reaction between a reactive carbonyl group of a carbohydrate and a primary amino acid of the composition. The reaction proceeds through a series of intermediate reactions to finally produce the brown nitrogenous polymers. The heat treating step is believed to at least develop precursors to the polymeric nitrogen containing compounds. During the post-extrusion baking step, the colors develop faster than an uncooked dough under similar baking conditions.

The flour component, shortening or fat component, and optionally the sugar or other texturizing components are heated in the cooker extruder generally to a temperature of at least about 150° F., preferably at least about 200° F., more preferably at least about 250° F., and most preferably from about 300° F. to about 500° F.

The average residence time for the flour, shortening or fat, and optional sugar components at these elevated temperatures in the extruder is, for example, from about 25 seconds to about 150 seconds.

The heat treated mass is formed at a relatively low pressure within the cooker extruder. Pressures during the heat treating stage are generally less than about 20 bars absolute, preferably less than about 10 bars absolute. It is believed that the use of low pressures in the cooker extruder reduces the tendency for oil to separate from the remaining cookie ingredients. Preferably, substantially no frictional heating occurs in the cooker extruder. Substantially all of the heating is preferably supplied by external or jacketed heating means. Generally, the work done in the production of the heat treated mass and dough-like mixture is low, for example, less than about 40 watt hrs/kg (or less than about 18 watt hrs/lb).

The heat treated mass temperature before and/or during admixing with water or a liquid source of water should be sufficiently low so that the added water does not result in substantial separation of oil and extruder surging. The reduction of the temperature of the heat treated mass substantially reduces mobility and immiscibility of the water and oil phases. Also, it has been observed that the oil is most likely to separate from the remaining mass at the points of highest pressure, such as at the extruder die. Generally, the lower the pressures encountered by the heat treated mass upon or subsequent to the addition of the water, the less the heat treated mass needs to be cooled to avoid substantial oil separation and extruder surging.

The cooling of the heat treated mass may begin in the extruder or after extrusion. Post extrusion cooling is preferred because it provides for longer residence times at elevated temperatures in the extruder for flavor and color development. The use of substantially the entire maximum available length of the extruder to heat treat the ingredients comprising oil, flour and optionally, at least one texturizing ingredient such as sugar, permits significant production of browning and flavor components. It further substantially reduces the amount of post extrusion heat treatment required for final baking of the output product.

Also, thermal stress on the extruder screws may be reduced by maintaining a more even temperature profile in the extruder. The separation of the heat treatment zone of the first stage extruder from the lower temperature operation of the second stage mixing apparatus also eliminates the loss of heat by conduction through the screw shafts and the screw elements because the screw shafts of the first and second mixing stages are physically separate from one another.

If the heat treated mass temperature is too low upon and/or during admixing it with the water or liquid source of water, viscosity may deleteriously increase. This may result in mixing difficulties, pressure increases, and substantial oil separation and extruder surging. Additionally, the less cooling performed within the cooker extruder and within the post extrusion mixer, the less is the amount of post extrusion heating needed for leavening.

If pressures are sufficiently low (such as when an extruder die is not utilized) and if the mass temperature during heat treatment is sufficiently low, no or substantially no cooling may be needed to avoid substantial oil separation or extruder surging. However, higher heat treated mass temperatures are preferred for: (1) the promotion of browning and flavor development, and (2) reduced post extrusion heating times. Thus, it is generally preferred that the heat treated mass be heated to a high temperature, for example about 300° F. to about 500° F., and that the heat treated mass temperature be reduced, as needed to avoid substantial oil separation or extruder surging, before and/or during admixing it with water or a liquid source of water. Cooling of the heat treated mass is preferably initiated prior to and continues during admixing it with water or a liquid source of water to reduce the risk of substantial oil separation upon mixing or extrusion.

Preferably, the heat treated mass temperature upon addition of water or a liquid source of water is from about 100° F. to about 300° F., more preferably from about 110° F. to about 212° F. Generally, the heat treated mass undergoes a temperature drop of at least about 35° F., preferably at least about 50° F. before and/or during admixing it with the water or liquid source of water. The heat treated mass is preferably cooled to a temperature below the boiling point of water (212° F.), more preferably to a temperature lower than about 200° F., most preferably less than about 150° F. before or during admixing it with the water or liquid source of water to reduce the risk of substantial steam generation, and substantial oil separation and extruder surging. Admixing the water or liquid source of water with the heat treated mass at a mass temperature which is lower than the minimum gelatinization temperature of the starches included in the formulation may further assure that no or substantially no starch gelatinization occurs, particularly as the amount of water is increased.

At the exit end prior to or at the optional post extrusion mixer die, which is generally the point of maximum pressure, the temperature of the dough-like mixture which is formed in the post extrusion mixer should be less than the boiling point of water (212° F.), more preferably less than about 200° F., most preferably less than about 150° F. Generally, the temperature of the heat treated mass and dough-like mixture in the post extrusion mixer should not be reduced to below about 100° F., for example, to avoid mixing difficulties, increased pressure, or increased risk of substantial oil separation or extruder surging due, for example, to increased viscosity or oil solidification. Also, excessively low extrudate temperatures may impair post extrusion forming, shaping, and cutting operations. Increased post extrusion heating times and/or temperatures for leavening purposes also result from excessive cooling.

In producing the dough-like mixtures in accordance with the present invention it is preferred that substantially no moisture content reduction occurs and that the dough-like mixture retains a sufficient amount of water for proper leavening during post extrusion heating.

All or a portion of the texturizing ingredient, such as solid, crystalline or granulated sugar, may be admixed with the cooled heat treated mass at the same or at a different location from addition of the water or other aqueous source to control the texture of the final baked product.

Addition of a solid, crystalline or granulated sugar, such as sucrose, and subjecting it to high extrusion temperatures tends to promote sugar melting and/or dissolution and thus a crunchy texture in the final product. Addition of all or a portion of the crystalline sugar to the cooled mass rather than subjecting it to high extrusion temperatures tends to avoid excessive sugar melting, and/or solubilization and promotes a tender texture in the final product. Thus, all, a portion (e.g. about 15% to about 85% by weight, based upon the total amount of solid, crystalline or granulated sugars), or none of the solid or crystalline sugars may be subjected to the heat treating stage to control texture in the final, post extrusion baked product.

Also, the greater the degree, or portion of sugar melting and/or dissolving, the less the viscosity of the extrudate. Accordingly, the relative amounts of solid or crystalline sugar: (a) subjected to heat treatment upstream, and (b) subjected only to the downstream cooling stage may be used to control the extrudate viscosity for subsequent forming or machining, and/or to control the texture of the final baked good.

The downstream or second stage addition of a texturizing ingredient, such as sugar, reduces the mass subjected to heat treatment which permits heating of the upstream or first stage ingredients to a higher temperature at a given throughput rate. Also, the downstream addition of the texturizing ingredient such as sugar, which is at a relatively low temperature (e.g. about room temperature) helps to cool the heat treated mass.

Various granulations may also be used to control the degree of sugar melting and/or dissolving, with larger sizes tending to result in less melting or dissolving. The addition of liquid sugar, such as sucrose syrup, may additionally promote crunchiness of the final product.

The residence time of the added liquid water or added liquid source of water, as well as the residence time of the texturizing ingredient, such as sugar, added downstream after initiation of the reduction of the heat treated mass temperature should be sufficient to enable the attainment of a substantially homogeneous dough-like mixture. The residence time in the cooling or reduced temperature stage should also be sufficiently long to reduce the mass temperature so as to avoid substantial expansion or puffing of the dough-like mass upon extrusion. The average residence time in the post extrusion mixer of the water and crystalline sugar added to the heat treated mass may, for example, be from about 60 seconds to about 180 seconds.

The heat treated mass upon exiting the cooker extruder may be further heated to promote further browning and flavor development and to reduce the amount of post extrusion heating needed for final baking of the output product provided that adverse oil separation or extruder surging does not occur. This further heating may be up to an additional 200° F. for a short period of time, e.g. 5–20 seconds. For example, a microwave heating device may be placed between the extruder and the post extrusion mixer for heating the heat treated mass before it enters the post extrusion mixer. The minimal amount of final baking required due to the use of the entire length of the extruder for heat treatment and the further use of the microwave applicator permits the addition of heat sensitive ingredients to the formulation, for example, through a downstream feed port in the post extrusion mixer.

A microwave applicator which may be used is disclosed in copending U.S. patent application Ser. No. 362,374 entitled "Extruder And Continuous Mixer Arrangement For Producing An At Least Partially Baked Product Having A Cookie-Like Crumb Structure The Extruder Including A Microwave Applicator" filed in the name of Bernhard Van Lengerich on June 7, 1989, which has been abandoned in favor of file wrapper continuation application No. 441,230, filed Nov. 22, 1989. The disclosure of the latter application is incorporated herein by reference in its entirety. As disclosed therein, the microwave applicator is formed as a continuation of the screw channel at the downstream most end of the extruder. The screw channel beyond the screw elements and within the microwave applicator is conformed to a round channel surrounded by a source of microwave energy. The residence time of the ingredients within the microwave applicator is relatively short, e.g. about 5–20 seconds.

Just prior to extrusion, or upon extrusion through an extruder die, the dough-like mixture formed in the post extrusion mixer may be heated, for example, by about 5° F. to about 30° F. This heating may be used to adjust dough consistency or viscosity provided that adverse oil separation or extruder surging does not occur. The post cooling heating may be used, for example, for controlling flow in the die, particularly at low moisture contents.

The pressure in the cooling stage is generally less than about 20 bars absolute, preferably less than about 10 bars absolute. The pressure drop across the extrusion die is generally less than about 20 bars and preferably less than about 10 bars. Low pressures are preferred to avoid separation of oil from the remaining mass and to avoid surging.

The leavening agents or pH adjusters may be added to the cooled mass in the cooling stage or they may be added prior to the cooling stage. They may be added in dry form either separately or as a pre-blend with the flour or solid or crystalline sugar, for example. They may also be added in aqueous form separately or as part of the added water. Emulsifiers may suitably be added with the shortening or fat in the heating stage or with the water in the cooling stage of the process of the present invention.

Ingredients which promote Maillard browning, such as proteinaceous materials and reducing sugars are preferably added in the heat treating stage. The dry ingredients may, for example, be preblended with the flour or added separately. The proteinaceous materials and the reducing sugars may also be added in the cooling stage depending upon the degree of browning desired, and the water content of the ingredients. These ingredients, as well as any other additives in dry form may be preblended with the upstream or downstream sugar, for example, or added separately therefrom. Likewise, additives which are in liquid form may be preblended with the added water or liquid source of water or they may be separately added to the extruder and/or post extrusion mixer. Generally, preblending of minor ingredients for addition to the extruder and/or post extrusion mixer is preferred for achieving homogeneity.

Heat labile ingredients, such as various vitamins, minerals, flavorings, coloring agents, sweeteners, such as aspartame, and the like, are preferably added in the cooling stage so as to reduce the possibility of thermal decomposition or degradation. The heat labile ingredients may, for example, be preblended with sugar added downstream in the cooling stage or with the added water. They may also be added separately, for instance downstream of the sugar or water addition.

Shear sensitive ingredients, such as chocolate chips or other flavored chips, raisins, nuts, fruit pieces or other inclusions or particulates are preferably added to the cooling stage. The shear sensitive ingredients are most preferably added downstream of the downstream sugar and water addition. Adding the shear sensitive ingredients near the exit or in the last barrel section of the post extrusion mixer serves to maintain particle integrity by reducing their exposure to the mechanical action of the screw elements. Flavor chips, such as chocolate chips may be added at temperatures below room temperature, for example at about 20° F. to about 65° F. so as to reduce melting of the chips in the dough-like mixture.

Generally, the heat treated mass is extruded from the cooker extruder without substantial moisture loss or flashing, such as would cause substantial expansion or puffing, because of the low water content of the mass and the low pressure drop upon exiting the extruder. Generally, a die is not used with the cooker extruder. The extrudate from the cooker extruder may be dropped or conveyed into the inlet of a continuous post-extrusion mixer.

The dough-like mixture is extruded from the post extrusion mixer to obtain an extrudate without substantial moisture loss or flashing because the temperature of the dough-like mixture exiting the post extrusion mixer is less than about 212° F. The extruded dough-like mixtures of the present invention will preferably have a shelf-stable water activity of less than about 0.7, preferably less than about 0.6. The shelf-stable compositions of the present invention may be packaged as shelf stable products in moisture and oxygen impermeable packaging materials for subsequent leavening and browning in a post extrusion oven such as a conventional home microwave or convection oven.

The dough-like mixture may exit the post extrusion mixer through a die having various shapes, such as animal shapes, circles, squares, triangles, star-shapes, and the like. The extrudate may be cut at the die by a rotating knife for example, or by a wire cutting device.

The dough-like mixture may be formed into a continuous rope by the use of a round shaped die orifice. It may also be formed into a ribbon or sheet by the use of a horizontally oriented slit or elongated sheet shaped die orifice. The continuous ropes, ribbons, or sheets may be cut into pieces using known reciprocating cutters.

The dough-like mixtures of the present invention may be extruded without the use of a die plate. The thus obtained extrudate, or even die-extruded extrudates, may be formed into pieces using conventional dough-shaping and forming equipment, such as rotary molders, wire cutting machines, sheeting rolls and reciprocating cutters, and the like.

Unlike conventional cookie production, the extruded dough-like mixtures of the present invention are generally formed into pieces when hot. Excessive cooling of the extrudate may result in crumbling of the pieces upon wire cutting or other cutting or shaping operations. Preferably, the extrudates are formed into pieces at temperatures of from about 100° F. to about 150° F.

Consistency, viscosity and plasticity of the extrudates for proper machining may be adjusted, for example, by: (a) water or oil addition or reduction in the extruder, (b) water addition or reduction in the post extrusion mixer, or (c) heating prior to the die, at the die, or after exiting from the die.

Cookie bits or cookie crumb-like products may be produced by extruding the dough-like mixture under very low pressure drops, e.g. without passing it through an extruder die, or at low die flow rates so that the extrudate spontaneously forms into pieces upon falling, onto a moving belt for example. Pieces or drops may also be produced by passing the dough-like mixture through a horizontal or vertical extruder die with a multitude of holes of a size of about ⅛" to about ½". The extrudate strands may then be cut at the die by a rotating knife into cylindrically shaped preheated dough bits.

The pieces may then be leavened by post extrusion heating to form cookie-like pieces or bits. The bits may be screened or sized to obtain cookie bits or "cookie chips" having a substantially uniform size distribution.

The cookie bits or cookie chips may be incorporated into other products, such as "granola type" bars. They may be used to produce a "cookie chip chocolate" product: (a) by incorporating the cookie chips or bits into molten chocolate in a mold and then solidifying the chocolate, (b) by pouring molten chocolate over the bits in a mold, or (c) by enrobing individual or a plurality of bits with melted chocolate. The cookie chips may, for example, have a maximum dimension of about ⅛" to about ½". The amount of the cookie bits incorporated into the product may, for example, be from about 10% by weight to about 90% by weight, based upon the weight of the cookie chip chocolate product. The leavened cookie-like pieces or bits also may be: (a) ground into crumbs for use in pie crusts, for example or, (b) compacted, in a mold for example, to produce unitary cookie products.

The unleavened dough bits may also be compacted in a mold to obtain a unitary product which may be subsequently leavened. Bits having different sizes and/or compositions may be combined in the mold to produce the unitary products.

Filled products may be produced in accordance with the present invention by coextruding the dough-like mixture with filler materials. The coextrudate may be formed by the use of a concentric die or a tube inserted within the die orifice. Filled products may also be produced by transporting the dough-like mixture extrudate to a conventional enrobing or encrusting machine, such as produced by the Rheon Manufacturing Company for post extrusion filling with a filler material.

Examples of fillers which may be used include chocolate, vanilla, butterscotch, fruit, peanut butter, and cheese-flavored fillings. The filling material may also be a separately produced dough-like mixture for the production of multi-flavored, multi-colored, or multi-textured cookie products.

The extrudate pieces are leavened and further browned using: (a) electromagnetic radiation or electronic heating, such as dielectric radio frequency heating, microwave heating, or infrared heating, (b) heated air, such as from a convection oven or fluidized bed heater, (c) frying, or (d) combinations thereof. For example, a combination may comprise microwave heating or dielectric radio frequency heating for internal heating and infrared heating for more intense surface heating. The microwave, infrared, and radio frequency energy may be applied at pressures of from about 0.2 bars to about 6 bars.

When applying dielectric heating, the low conductive food product to be heated is placed between electrodes, which act as capacitor plates, and forms the dielectric of one or more capacitors. A high frequency voltage is applied across the electrodes. Alternating of the electrostatic field or of the polarity of the voltage results in heating of the product.

The frequencies generally used for dielectric heating are about 2 to 90 MHz, e.g. about 13-14 MHz, about 27 MHz, or about 40-41 MHz. The frequencies generally used for microwave heating are, for example, about 2,450 MHz for domestic ovens and about 896 to 915 MHz for industrial ovens.

The heating of the pieces in the dielectric or radio frequency oven, microwave oven, or combinations thereof, or in a fryer is generally performed so that proper leavening and browning is achieved, for example, within about 90 seconds, preferably within about 60 seconds, depending upon the thickness and diameter of the pieces. Infrared heating, conductive heating, and hot air heating are generally conducted within about two to three minutes. Infrared heating should generally be performed subsequent to another form of post extrusion heating. It tends to heat the surface and form a skin which prevents leavening gases from escaping. Generally, the heating of the pieces or cookie preforms in the post extrusion oven should be sufficient to result in an internal temperature of at least about 160° F., preferably at least about 190° F. in the cookie.

Dielectric radio frequency ovens, microwave ovens, infrared ovens, hot air ovens, and the like which may be used are conventional, industrial scale continuous throughput ovens. Continuous, conventional fryers may also be used in embodiments of the present invention. Conductive heating devices which may be used include waffle-type conductive heaters.

The post extrusion heated leavened products of the present invention have a water activity of less than about 0.7, preferably less than about 0.6. The water content of the products is generally less than about 6% by weight, suitably from about 2% by weight to about 4% by weight, based upon the weight of the post extrusion baked product, exclusive of inclusions. The products exhibit a cookie crumb-like structure appearance, and texture and structural integrity. Starch gelatinization (measured by differential scanning calorimetry) for the cookie products of the present invention is generally less than about 5%.

In the process of the present invention, a cooker extruder having two screws is preferably utilized. Preferably the screws of the extruder will be co-rotating, i.e., rotate in the same direction. Co-rotating twin screw elements, generally provide thorough mixing and conveying of the components, with the elements of one screw continuously wiping the other screw. This is particularly advantageous when the composition being mixed has a relatively high viscosity. Suitable extruders which may be used in the present invention include: (1) WENGER model series TX by Wenger of Sabetha, Kansas, (2) model series MPF by Baker Perkins, (3) model series BC by Creusot Loire of Paris, France, and preferably (4) model series ZSK or Continua by Werner and Pfleiderer. Single screw extruders including those with a horizontally oscillating screw during rotation (i.e. a Buss kneader by Buss of Pratteln, Switzerland) may also be used in accordance with the present invention.

The post extrusion mixer may be at least one additional extruder or one or more commercially available continuous mixers. The post extrusion mixers may be operated in series or parallel to each other. A continuous mixer for use in the present invention comprises co-rotating screws and jacketed barrels with heating and/or cooling means. A continuous mixer is similar in construction to a cooker extruder except that for the same screw diameter, a continuous mixer has a greater free internal volume and thus operates to mix and convey ingredients at relatively lower pressures and shear than does an extrusion cooker to obtain a substantially homogeneous output. A continuous mixer which may be used is model ZPM-120 by Werner and Pfleiderer.

An extruder is preferable as the second stage mixing device when a pressure build up is required for shaping, as for example, through an extrusion die. The extruder also permits an axial exit of the extrudate for unidirectional continuous processing. On the other hand, in a high volume production environment, a continuous mixer is preferred to provide a higher volumetric throughput and a better heat transfer from the ingredients for efficient and rapid cooling. A continuous mixer also permits a more efficacious particulate feeding.

Screw configurations which may be used in the present invention are disclosed in copending U.S. patent application Ser. No. 362,579 entitled "Extruder And Continuous Mixer Arrangement For Producing An At Least Partially Baked Product Having A Cookie-Like Crumb Structure" filed in the name of Bernhard Van Lengerich on even date June 7, 1989. The disclosure of the latter application is incorporated herein by reference in its entirety. Screw configurations which may be used in the present invention with a model ZSK-57 twin screw cooker extruder are shown in FIGS. 4 and 6 of said application. Screw configurations which may be used in the present invention with a second stage or post extrusion mixing device are shown in FIGS. 5 and 7 of said application. The FIG. 5 screw configuration may be used where the second stage mixing device comprises an extruder. The FIG. 7 screw configuration may be used with a model ZSK-120 continuous mixer as the second stage mixing device.

The extruder throughput or mass flow rates utilized in the present invention with a Werner and Pfleiderer ZSK 57 twin screw cooker extruder are generally from about 150 lbs/hr to about 850 lbs/hr of extrudate. Higher rates may be achieved with other models. For example, a throughput rate of 6000 lbs/hr may be achieved using a Werner and Pfleiderer model Continua 120 cooker extruder.

The present invention is further illustrated in the following examples where all parts, ratios, and percentages are by weight and all temperatures are in °F., unless otherwise stated:

EXAMPLE 1

The ingredients, their feed placement, and their relative amounts used to prepare a cookie having a crumblike structure and texture using extrusion heating, post extrusion mixing and microwave baking in accordance with the present invention were:

| INGREDIENT AND PLACEMENT | WEIGHT % |
| --- | --- |
| Component 1: first dry feed port | |
| Wheat flour, bleached (about 12% by weight water) | 50.19 |
| Non-fat dry milk (about 52% by weight lactose) | 1.51 |
| Salt | 0.75 |
| Component 2: second dry feed port | |
| White sugar (sucrose), granulated | 15.82 |
| Brown sugar (about 89% sucrose, 3% invert, 4% non-sugar solids, 3% water) | 7.38 |
| Component 3: first liquid feed port | |
| Soybean spray oil | 22.53 |
| Component 4: second liquid feed port | |
| Tap water | 0.81 |
| Component 5: second dry feed port | |
| Sodium bicarbonate | 1.01 |
| Total | 100.00 |

The co-rotating twin screw cooker extruder used to prepare the cookie products of the present invention was a Werner and Pfleiderer ZSK-57 equipped with an extruder screw configuration as shown in FIG. 6 of copending U.S. patent application Ser. No. 362,579 entitled "Extruder And Continuous Mixer Arrangement For Production Of An At Least Partially Baked Product Having A Cookie-Like Crumb Structure," filed in the name of Bernhard Van Lengerich on even date June 7, 1989. The extruder had twelve barrels, each provided with external, jacketed heating and cooling means. The first dry feed port was set up at barrel 1 and was open to the atmosphere. The first liquid feed port was set up between barrels 1 and 2.

The first barrel, which contained the first dry feed port, was set on constant cool. The remaining eleven barrels were divided into 7 separately measured barrel temperature zones. Barrels 2 and 3 corresponded to temperature zone 1, barrel 4 corresponded to zone 2, barrels 5 and 6 corresponded to zone 3, barrels 7 and 8 corresponded to zones 4, and 5, respectively, barrels 9 and 10 corresponded to temperature zone 6, and barrels 11 and 12 corresponded to temperature zone 7. The thermocouples for measuring actual barrel temperatures were located in barrels 2, 4, 5, 7, 8, 10, and 12. Barrels 2 through 12 were set to heat to 300° F.

Paddles and screw elements were arranged on the screw shafts from upstream to downstream to provide: (a) rapid conveying of the added dry ingredients in barrel 1, (b) conveying of the dry ingredients and added oil and gradually increasing the degree of fill in barrel 2, (c) chopping or mixing action for admixing the oil and dry ingredients, conveying to gradually increase the degree of fill, and mixing in barrel 3, (d) repeated conveying and an increased degree of mixing in barrel 4, (e) increased mixing, conveying and increased mixing to gradually increase the degree of fill in each of barrels 5 and 6, (f) increased mixing, conveying, and increased mixing to provide the highest degree of mixing in barrel 7, (g) fast conveying in barrel 8, (h) conveying with a gradual increase in degree of fill in barrel 9, (i) conveying and mixing with a gradual increase in degree of fill in barrel 10, (j) conveying and mixing in barrel 11, and (k) conveying with a buildup in pressure sufficient to transport the heat treated mass out of the open end of the extruder. An extruder die was not utilized. Gradually increasing the degree of fill tends to reduce points of high pressure which may cause oil separation. The fast conveyance initiated in barrel 8 may be used for the optional addition of crystalline sugar into the heat treatment zone via an optionally opened feed port in barrel 8. The optional addition of the crystalline sugar in barrel 8 may be used to reduce the exposure of the sugar to full heat treatment as a further control over the crunchiness of the cookie.

The twin screw continuous mixer used to prepare the cookie products of the present invention was a Werner and Pfleiderer ZPM-120 equipped with a screw configuration as shown in FIG. 7 of copending U.S. patent application Ser. No. 362,579 entitled "Extruder And Continuous Mixer Arrangement For Production Of An At Least Partially Baked Product Having A Cookie-Like Crumb Structure," filed in the name of Bernhard Van Lengerich on even date June 7, 1989. The continuous mixer had three barrel sections fastened end-to-end, each provided with cooling jackets for water flow. A cooling water flow is pumped through the jackets in the barrel sections to reduce and adjust the temperature of the composition during the gentle mixing and conveying in the continuous mixer. The second dry feed port was set up at barrel 1 of the continuous mixer and was open to the atmosphere. The second liquid feed port was the same as the second dry feed port at barrel 1. The second liquid feed inlet pipe was inserted into the open port at barrel 1 so that the second dry feed ingredients and the second liquid feed ingredients were separately fed into the same open port. The vertical output opening of the continuous mixer was located at the bottom end portion of the third barrel.

The single lobe screw element of barrel 1 rapidly conveys the heat treated ingredients comprising flour and oil from the extruder together with the dry ingredients input through the second dry feed port and the added water fed via the second liquid feed port into the screw channel of the continuous mixer.

Kneading discs with intermediate double lobe conveying elements gently mix and convey the dough-like mass including added water toward the vertical output opening. The left hand staggering of some of the kneading discs reduces the rate of conveying within the kneading discs to increase the amount of mixing. Kneading discs with pitch are located downstream of the left hand staggered kneading disks to both mix and convey the ingredients.

The third barrel was equipped with a third feed port, which was open to the atmosphere, for input of shear sensitive and/or heat sensitive ingredients such as particulate ingredients, e.g., nuts, chocolate chips, raisins, etc. This downstream inlet port is arranged above double lobe screw elements which provide a conveyance zone within the continuous mixer for rapid intake of particulate materials, for example, which may be input through the port.

A double lobe conveying element is arranged partially above the vertical output opening to convey the dough-like mass toward and out of the continuous mixer. Kneading discs with pitch located downstream of the latter double lobe conveying element tend to dump the ingredients fed by the double lobe screw element out the opening.

The cooker extruder screws were rotated at about 130 rpm at about 1% of maximum torque. The continuous mixer screws were rotated at about 60 rpm at about 19% of maximum torque. The ingredients were fed in their relative amounts to provide a throughput or mass flow rate of the dough-like mixture extrudate from the continuous mixer of about 297 lbs/hrs.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogeneous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port. Component 5 was continuously fed to the second dry feed port, separate from component 2.

On a calculated basis, the water content of the dough-like mixture formed in the continuous mixer was about 7.1% by weight, based upon the total weight of the dough-like mixture.

At steady state, the barrel set temperature and the actual barrel temperature for the cooker extruder were:

| Barrel # | Barrel Set Temperature, °F. | Actual Barrel Temperature, °F. |
| --- | --- | --- |
| 1 | cool | — |
| 2 | 300 | 271 |
| 3 | 300 | — |
| 4 | 300 | 268 |
| 5 | 300 | 300 |
| 6 | 300 | — |
| 7 | 300 | 299 |
| 8 | 300 | 269 |
| 9 | 300 | — |
| 10 | 300 | 265 |
| 11 | 300 | — |
| 12 | 300 | 300 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperatures in the extruder were about 217° F. at barrel 3, about 222° F. at barrel 5, and about 281° F. at barrel 11. The average or median residence time of the ingredients heated in the cooker extruder was about 60–90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The extrudate temperature upon exiting the extruder was about 201° F. The substantially homogeneous dough-like mixture formed in the continuous mixer was extruded from the mixer without a die and resulted in a substantially unleavened extrudate. The dough-like mixture upon exiting the continuous mixer had a temperature of about 130° F. The dough-like mixture was immediately transferred to an auger fed wire-cutting machine and was cut into pieces while hot. The diameter of the pieces was about 1 inch. The consistency of the dough-like mixture was measured at about 72° F. using an Instron Texture Analyzer Model 4202 equipped with a cylindrical shaped probe having a diameter of 4 mm. The dimensions of the sample were about 1 inch square by about ¼ inch high. The probe was set to penetrate the sample at a constant speed of 0.2 inches/min. With strain measured in inches and stress measured in lbs force, the modulus of the dough-like mixture sample was about 232 psi.

Eight pieces were subjected to microwaving in a microwave oven for about 70 seconds to produce distinctly leavened cookies. The cookies were surface browned and had a crumb-like structure and crumb-like texture.

EXAMPLE 2

Cookies having a crumb-like structure and texture may be produced as in Example 1 except: after wire cutting, the pieces may be subjected to heating in a continuous 12 kw dielectric radio frequency (27 MHz) oven for about 60 seconds to produce distinctly leavened, surface browned cookies.

EXAMPLE 3

The procedure of Example 1 was followed using a composition without added water. The equipment of Example 1 was used in this Example. The ingredients, their feed placement, and their relative amounts were:

| INGREDIENT AND PLACEMENT | WEIGHT % |
| --- | --- |
| Component 1: first dry feed port | |
| Wheat flour, bleached (about 12% by weight water) | 50.60 |
| Non-fat dry milk (about 52% by weight lactose) | 1.52 |
| Salt | 0.76 |
| Component 2: second dry feed port | |
| White sugar (sucrose), granulated | 15.95 |
| Brown sugar (about 89% sucrose, 3% invert, 4% non-sugar solids, 3% water) | 7.44 |
| Component 3: first liquid feed port | |
| Soybean spray oil | 22.71 |
| Component 4: second liquid feed port | |
| Tap water | none |
| Component 5: second dry feed port | |
| Sodium bicarbonate | 1.02 |
| Total | 100.00 |

The cooker extruder screws were rotated at about 120 rpm at about 1% of maximum torque. The continuous mixer screws were rotated at about 60 rpm at about 19% of maximum torque. The ingredients were fed in their relative amounts to provide a throughput or mass flow rate of the dough-like mixture extrudate from the continuous mixer of about 295 lbs/hrs.

The components were prepared and fed as in Example 1 except component 4, the tap water, was not used.

On a calculated basis, the water content of the dough-like mixture formed in the continuous mixer was about 6.3% by weight, based upon the total weight of the dough-like mixture.

At steady state, the barrel set temperatures and the actual barrel temperatures for the cooker extruder were:

| Barrel # | Barrel Set Temperature, °F. | Actual Barrel Temperature, °F. |
| --- | --- | --- |
| 1 | cool | — |
| 2 | 300 | 253 |
| 3 | 300 | — |
| 4 | 300 | 253 |
| 5 | 300 | 277 |
| 6 | 300 | — |
| 7 | 300 | 288 |
| 8 | 300 | 268 |
| 9 | 300 | — |
| 10 | 300 | 253 |
| 11 | 300 | — |
| 12 | 300 | 286 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperatures in the extruder were about 217° F. at barrel 3, about 222° F. at barrel 5, and about 281° F. at barrel 11. The average or median residence time of the ingredients heated in the cooker extruder was about 60–90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The extrudate temperature upon exiting the extruder was about 205° F. The substantially homogeneous mixture formed in the continuous mixer was extruded from the mixer without a die and resulted in a substantially unleavened extrudate. The mixture upon exiting the continuous mixer had a temperature of about 132° F. The mixture had a low viscosity and was immediately transferred to an auger fed wire-cutting machine. However, the mixture was too soft for cutting on the wire cutter. The modulus of the mixture, as measured in Example 1, was about 35 psi. The low moisture mixture may be packaged as a shelf-stable product.

The viscosity of the mixture, either before or after packaging, may be increased by the addition of water, in an amount of about 1% by weight for example, to provide proper consistency for shaping or machining. The dough-like mixture may then be leavened by subjecting it to microwave energy or convection heating to obtain distinctly leavened, surface browned cookies having a crumb-like structure and texture.

EXAMPLE 4

The procedure of Example 1 was followed using a composition with about 2.45% by weight added water, based upon the weight of the composition. The equipment of Example 1 was used in this Example. The ingredients, their feed placement, and their relative amounts were:

| INGREDIENT AND PLACEMENT | WEIGHT % |
| --- | --- |
| Component 1: first dry feed port | |
| Wheat flour, bleached (about 12% by weight water) | 49.37 |
| Non-fat dry milk (about 52% by weight lactose) | 1.48 |
| Salt | 0.74 |
| Component 2: second dry feed port | |
| White sugar (sucrose), granulated | 15.55 |
| Brown sugar (about 89% sucrose, 3% invert, 4% non-sugar solids, 3% water) | 7.26 |
| Component 3: first liquid feed port | |
| Soybean spray oil | 22.16 |
| Component 4: second liquid feed port | |
| Tap water | 2.45 |
| Component 5: second dry feed port | |
| Sodium bicarbonate | 0.99 |
| Total | 100.00 |

The components were prepared and fed as in Example 1. The cooker extruder screws were rotated at about 120 rpm at about 1% of maximum torque. The continuous mixer screws were rotated at about 60 rpm at about 19% of maximum torque. The ingredients were fed in their relative amounts to provide a throughput or mass flow rate of the extrudate from the continuous mixer of about 302 lbs/hrs.

On a calculated basis, the water content of the mixture formed in the continuous mixer was about 8.6% by weight, based upon the total weight of the mixture.

At steady state, the barrel set temperatures and the actual barrel temperatures for the cooker extruder were:

| Barrel # | Barrel Set Temperature, °F. | Actual Barrel Temperature, °F. |
| --- | --- | --- |
| 1 | cool | — |
| 2 | 300 | 284 |
| 3 | 300 | — |
| 4 | 300 | 288 |
| 5 | 300 | 300 |
| 6 | 300 | — |
| 7 | 300 | 300 |
| 8 | 300 | 271 |
| 9 | 300 | — |
| 10 | 300 | 278 |
| 11 | 300 | — |
| 12 | 300 | 300 |

Tap water was passed through the cooling jackets of the continuous mixer to cool the heat treated mass from the extruder while admixing it with the other ingredients fed to the continuous mixer The pressure in the extruder and in the continuous mixer was less than about 10 bars. The material temperatures in the extruder were about 237° F. at barrel 3, about 230° F. at barrel 5, and about 248° F. at barrel 11. The average or median residence time of the ingredients heated in the cooker extruder was about 60–90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The extrudate temperature upon exiting the extruder was about 201° F. The substantially homogeneous mixture formed in the continuous mixer was extruded from the mixer without a die and resulted in a substantially unleavened extrudate. The mixture upon exiting the continuous mixer had a temperature of about 130° F. The mixture was immediately transferred to an auger fed wire-cutting machine. However, the mixture was too crumbly for cutting on the wire cutter. The modulus of the mixture, as measured in Example 1, was about 1121 psi.

The consistency of the mixture, can be decreased by increasing the amount of oil, by reducing or increasing the amount of water added, by reducing the heat treating temperatures, or by a combination thereof to provide proper consistency for wire cutting. However, the obtained dough-like mixture may be successfully machined in a rotary molder to form individual pieces. The dough-like mixture may then be leavened by subjecting it to microwave energy or dielectric radio frequency heating to obtain distinctly leavened, surface browned cookies having a crumb-like structure and texture.

EXAMPLE 5

The ingredients, their feed placement, and their relative amounts used to prepare a cookie having a crumb-like structure and texture using extrusion heating, post extrusion mixing and microwave baking in accordance with the present invention were

| INGREDIENT AND PLACEMENT | WEIGHT % |
| --- | --- |
| Component 1: first dry feed port | |
| Wheat flour, bleached (about 12% by weight water) | 50.50 |
| Non-fat dry milk (about 52% by weight lactose) | 1.51 |
| Salt | 0.76 |
| Component 2: second dry feed port | |
| White sugar (sucrose), granulated | 15.06 |
| Brown sugar (about 89% sucrose, 3% invert, 4% non-sugar solids, 3% water) | 7.03 |
| Component 3: first liquid feed port | |
| Soybean spray oil | 22.67 |
| Component 4: second liquid feed port | |
| Tap water | 1.22 |
| Component 5: second dry feed port | |
| Sodium bicarbonate | 1.25 |
| Total | 100.00 |

The procedure of Example 1 was followed and the equipment of Example 1 was used in this Example. The cooker extruder screws were rotated at about 125 rpm at about 3% of maximum torque. The continuous mixer screws were rotated at about 60 rpm at about 19% of maximum torque. The ingredients were fed in their relative amounts to provide a throughput or mass flow rate of the dough-like mixture extrudate from the continuous mixer of about 295 lbs/hr.

On a calculated basis, the water content of the dough-like mixture formed in the continuous mixer was about 7.5% by weight, based upon the total weight of the dough-like mixture.

The barrel set temperatures in the cooker extruder were constant cool in barrel 1 and 350° F. in barrels 2 through 12. Actual barrel temperatures for the cooker extruder were not measured.

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The average or median residence time of the ingredients heated in the cooker extruder was about 60–90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The dough-like mixture temperature within the exit of the extruder was about 255° F. The substantially homogeneous mixture formed in the continuous mixer was extruded from the mixer without a die and resulted a substantially unleavened extrudate. The mixture upon exiting the continuous mixer had a temperature of about 126° F. The dough-like mixture was immediately transferred to an auger fed wire-cutting machine and was cut into pieces while about 106° F. The diameter of the pieces was about 1 inch.

Eight pieces were subjected to microwaving in a microwave oven for about 70 seconds to produce distinctly leavened cookies. The cookies were surface browned and had a crumb-like structure and crumb-like texture.

EXAMPLE 6

Cookies having a crumb-like structure and texture using extrusion heating, post extrusion mixing and dielectric radio frequency baking in accordance with the present invention may be produced as in Example 5 except: after wire cutting the pieces may be subjected to heating in a continuous 12 kw dielectric radio frequency (27 MHz) oven set at about 81% power for about 60 seconds to produce distinctly leavened, surface browned cookies.

EXAMPLE 7

The ingredients, their feed placement, and their relative amounts used to prepare a cookie having a crumb-like structure and texture using extrusion heating, post extrusion mixing and microwave baking in accordance with the present invention were:

| INGREDIENT AND PLACEMENT | WEIGHT % |
| --- | --- |
| Component 1: first dry feed port | |
| Wheat flour, bleached (about 12% by weight water) | 49.43 |
| Non-fat dry milk (about 52% by weight lactose) | 1.48 |
| Salt | 0.74 |
| Component 2: second dry feed port | |
| White sugar (sucrose), granulated | 15.58 |
| Brown sugar (about 89% sucrose, 3% invert, 4% non-sugar solids, 3% water) | 7.26 |
| Component 3: first liquid feed port | |
| Soybean spray oil | 22.35 |
| Component 4: second liquid feed port | |
| Tap water | 2.23 |
| Component 5: second dry feed port | |
| Sodium bicarbonate | 0.93 |
| Total | 100.00 |

The procedure of Example 1 was followed and the equipment of Example 1 was used in this Example. The cooker extruder screws were rotated at about 125 rpm. The continuous mixer screws were rotated at about 60 rpm at about 23% of maximum torque. The ingredients were fed in their relative amounts to provide a throughput or mass flow rate of the dough-like mixture extrudate from the continuous mixer of about 302 lbs/hrs.

On a calculated basis, the water content of the dough-like mixture formed in the continuous mixer was about 8.4% by weight, based upon the total weight of the dough-like mixture.

At steady state, the barrel set temperatures and the actual barrel temperatures for the cooker extruder were:

| Barrel # | Barrel Set Temperature, °F. | Actual Barrel Temperature, °F. |
| --- | --- | --- |
| 1 | cool | — |
| 2 | 300 | 205 |
| 3 | 300 | — |
| 4 | 300 | 202 |
| 5 | 300 | 300 |
| 6 | 300 | — |
| 7 | 300 | 300 |
| 8 | 300 | 270 |
| 9 | 300 | — |
| 10 | 300 | 255 |
| 11 | 300 | — |
| 12 | 300 | 301 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperature in the extruder at barrel 12 was about 290° F. The average or median residence time of the ingredients heated in the cooker extruder was about 60-90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The dough-like mixture temperature within the exit of the extruder was about 265° F. The substantially homogeneous dough-like mixture formed in the continuous mixer was extruded from the mixer without a die and resulted in a substantially unleavened extrudate. The dough-like mixture upon exiting the continuous mixer had a temperature of about 118° F. The dough-like mixture was pressed into a sheet about 5 mm thick by hand while hot. The sheet was cut into cylindrical pieces by hand using a cookie cutter. The diameter of the pieces was about 1¼ inch.

Six pieces were subjected to microwaving in a microwave oven for about 45 seconds to produce distinctly leavened cookies. The cookies were surface browned and had a crumb-like structure and crumb-like texture.

EXAMPLE 8

Cookies having a crumb-like structure and texture using extrusion heating, post extrusion mixing and microwave baking in accordance with the present invention were produced as in Example 7 except nut pieces were added to the open third dry feed port in barrel 3 of the continuous mixer at a rate of about 120 lbs/hr.

EXAMPLE 9

A cookie having a crumb-like structure and texture using extrusion heating, post extrusion mixing and microwave baking may be produced in accordance with the present invention as in Example 1 except: (a) the screw configuration for the Werner and Pfleiderer ZSK-57 cooker extruder may be replaced with the screw configuration shown in FIG. 4 of copending U.S. patent application Ser. No. 362,579 entitled "Extruder And Continuous Mixer Arrangement For Production Of An At Least Partially Baked Product Having A Cookie-Like Crumb Structure," filed in the name of Bernhard Van Lengerich on even date June 7, 1989, and (b) the Werner and Pfleiderer ZPM-120 continuous mixer may be replaced with a four barrel extruder and screw configuration as shown in FIG. 5 of said latter application.

For the Werner and Pfleiderer ZSK-57 extrusion cooker, paddles and screw elements are arranged on the screw shafts from upstream to downstream to provide: (a) rapid conveying of the added dry ingredients in barrel 1, (b) conveying of the dry ingredients and added oil and gradually increasing the degree of fill in barrel 2, (c) chopping or mixing action for admixing the oil and dry ingredients, conveying to gradually increase the degree of fill, and mixing in barrel 3, (d) repeated conveying and an increased degree of mixing in barrel 4, (e) increased mixing, conveying and increased mixing to gradually increase the degree of fill in each of barrels 5 and 6, (f) increased mixing, conveying, and increased mixing to provide the highest degree of mixing in barrel 7, (g) further conveying and vigorous mixing in barrels 8, 9, 10 and 11, and (h) increased speed of conveyance to transport the heat treated mass out of the open end of the extruder. Gradually increasing the degree of fill tends to reduce points of high pressure which may cause oil separation.

For the second stage twin screw extruder (12 l/d) described in said latter copending U.S. patent application Ser. No. 362,579, four barrel sections are fastened end-to-end, each provided with external jacketed heating and cooling means. The second dry feed port is set up at barrel 1 of the second stage extruder and is open to the atmosphere. The second liquid feed port is the same as the second dry feed port at barrel 1. The second liquid feed inlet pipe is inserted into the open port at barrel 1 so that the second dry feed ingredients and the second liquid feed ingredients can be separately fed into the same open port.

For the screw configuration of the second stage twin screw extruder shown in FIG. 5 of said latter copending U.S. patent application Ser. No. 362,579 relatively high pitch screw elements are arranged directly below the second dry ingredient feed port and second liquid inlet to convey the added ingredients downstream and away from the feed port. These elements rapidly convey the heat treated mass from the extruder and the liquid and dry ingredients added to the second stage extruder via the second dry ingredient feed port in barrel 1 of the second stage extruder.

The rapid conveying screw elements of barrel 1 are followed by alternating kneading blocks with interposed screw elements in barrel 2 of the second stage extruder. The screw elements in barrel 2 are shorter and of lower pitch than the screw elements of barrel 1 so that, together with the kneading blocks, they act to lower the speed of conveyance and increase the degree of fill to permit thorough mixing by the kneading blocks in barrel 2. However, the number of alternating kneading blocks is fewer than in the first stage cooker extruder to provide a lower pressure and gentle mixing to protect the crystalline structure of the sugar grains.

The alternating kneading blocks are followed by three screw elements in barrel 3 of gradually decreasing pitch and length to feed the ingredients into final kneading blocks for final mixing in barrel 4. In barrel 4 a screw element is interposed between the kneading blocks, and a final screw element is arranged downstream from the kneading blocks to output the at least substantially homogeneous cookie dough from the second stage extruder. The exit portion of the second stage extruder is located at the bottom end portion of barrel 4.

A third dry feed port, open to the atmosphere, can be formed in barrel 3 for input of shear sensitive and/or heat sensitive ingredients such as particulate ingredients, e.g., nuts, chocolate chips etc. The screw elements below the third dry feed port increase the speed of conveyance of the ingredients which decreases the degree of fill and facilitates the intake and mixing of particulate materials by the kneading blocks in barrel 4.

EXAMPLE 10

The ingredients, their feed placement, and their relative amounts used to prepare a rotary molded cookie having a crumb-like structure and texture using extrusion heating, post extrusion mixing and microwave baking in accordance with the present invention were:

| INGREDIENT AND PLACEMENT | WEIGHT % |
|---|---|
| Component 1: first dry feed port | |
| Wheat flour, bleached (about 12% by weight water) | 46.22 |
| Non-fat dry milk (about 52% by weight lactose) | 1.39 |
| Salt | 0.69 |
| Component 2: second dry feed port | |
| White sugar (sucrose), granulated | 14.57 |
| Brown sugar (about 89% sucrose, 3% invert, 4% non-sugar solids, 3% water) | 6.78 |
| Component 3: first liquid feed port | |
| Soybean spray oil | 18.27 |
| Component 4: second liquid feed port | |
| Tap water | 11.15 |
| Component 5: second dry feed port | |
| Sodium bicarbonate | 0.93 |
| Total | 100.00 |

The procedure of Example 1 was followed and the equipment of Example 1 was used in this Example. The cooker extruder screws were rotated at about 120 rpm at about 2% of maximum torque. The continuous mixer screws were rotated at about 60 rpm at about 21% of maximum torque. The ingredients were fed in their relative amounts to provide a throughput or mass flow rate of the dough-like mixture extrudate from the continuous mixer of about 323 lbs/hrs.

On a calculated basis, the water content of the dough-like mixture formed in the continuous mixer was about 16.9% by weight, based upon the total weight of the dough-like mixture.

At steady state, the barrel set temperatures and the actual barrel temperatures for the cooker extruder were:

| Barrel # | Barrel Set Temperature, °F. | Actual Barrel Temperature, °F. |
|---|---|---|
| 1 | cool | — |
| 2 | 350 | 300 |
| 3 | 350 | — |
| 4 | 350 | 312 |
| 5 | 350 | 327 |
| 6 | 350 | — |
| 7 | 350 | 350 |
| 8 | 350 | 336 |
| 9 | 350 | — |
| 10 | 350 | 350 |
| 11 | 350 | — |
| 12 | 350 | 349 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperature in the extruder at barrels 3, 5, and 11 was about 243° F., 244° F., and 333°, respectively. The average or median residence time of the ingredients heated in the cooker extruder was about 60-90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The extrudate temperature upon exiting the extruder was about 215° F. The substantially homogeneous dough-like mixture formed in the continuous mixer was extruded from the mixer without a die and resulted in a substantially unleavened extrudate. The dough-like mixture upon exiting the continuous mixer had a temperature of about 107° F. The dough-like mixture was formed into pieces using a rotary molder having the detailing of an Oreo cookie base cake. The dough-like mixture was formed into pieces and the pieces were successfully released from the rotary molder, but the pieces were devoid of detailing. The dough-like mixture may be successfully rotary molded in a less detailed rotary mold.

Six pieces were subjected to microwaving in a microwave oven for about 40 seconds to produce distinctly leavened cookies. The cookies were surface browned and had a crumb-like structure and crumb-like texture.

EXAMPLE 11

The ingredients, their feed placement, and their relative amounts used to prepare a rotary molded cookie having a crumb-like structure and texture using extrusion heating, post extrusion mixing and microwave baking in accordance with the present invention were:

| INGREDIENT AND PLACEMENT | WEIGHT % |
|---|---|
| Component 1: first dry feed port | |
| Wheat flour, bleached (about 12% by weight water) | 45.23 |
| Non-fat dry milk (about 52% by weight lactose) | 1.36 |
| Salt | 0.68 |
| Component 2: second dry feed port | |
| White sugar (sucrose), granulated | 14.26 |
| Brown sugar (about 89% sucrose, 3% invert, 4% non-sugar solids, 3% water) | 6.65 |
| Component 3: first liquid feed port | |
| Soybean spray oil | 19.09 |
| Component 4: second liquid feed port | |
| Tap water | 11.82 |
| Component 5: second dry feed port | |
| Sodium bicarbonate | 0.91 |
| Total | 100.00 |

The procedure of Example 1 was followed and the equipment of Example 1 was used in this Example. The cooker extruder screws were rotated at about 120 rpm at about 1% of maximum torque. The continuous mixer screws were rotated at about 60 rpm at about 21% of maximum torque. The ingredients were fed in their relative amounts to provide a throughput or mass flow rate of the dough-like mixture extrudate from the continuous mixer of about 330 lbs/hrs.

On a calculated basis, the water content of the dough-like mixture formed in the continuous mixer was about 17.4% by weight, based upon the total weight of the dough-like mixture.

At steady state, the barrel set temperatures and the actual barrel temperatures for the cooker extruder were:

| Barrel # | Barrel Set Temperature, °F. | Actual Barrel Temperature, °F. |
|---|---|---|
| 1 | cool | — |
| 2 | 350 | 295 |
| 3 | 350 | — |
| 4 | 350 | 316 |
| 5 | 350 | 325 |
| 6 | 350 | — |
| 7 | 350 | 350 |
| 8 | 350 | 333 |
| 9 | 350 | — |
| 10 | 350 | 350 |
| 11 | 350 | — |
| 12 | 350 | 350 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperature in the extruder at barrels 3, 5, and 11 was about 255° F., 245° F., and 33° F., respectively. The average or median residence time of the ingredients heated in the cooker extruder was about 60-90 seconds. The average or median residence time of the ingredients in the continuous mixer from the second feed ports was about 9 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The extrudate temperature upon exiting the extruder was about 240° F. The substantially homogeneous dough-like mixture formed in the continuous mixer was extruded from the mixer without a die and resulted in a substantially unleavened extrudate. The dough-like mixture upon exiting the continuous mixer had a temperature of about 114° F. The dough-like mixture was formed into pieces using a rotary molder. The detailing was better than that obtained in Example 10.

Six pieces were subjected to microwaving in a microwave oven for about 40 seconds to produce distinctly leavened cookies. The cookies were surface browned and had a crumb-like structure and crumb-like texture.

EXAMPLE 12

The procedure of Example 1 was followed using a composition with about 12.61% by weight added water, based upon the weight of the composition. The equipment and procedure of Example 11 was used in this Example. The ingredients, their feed placement, and their relative amounts were:

| INGREDIENT AND PLACEMENT | WEIGHT % |
|---|---|
| Component 1: first dry feed port | |
| Wheat flour, bleached (about 12% by weight water) | 49.37 |

| INGREDIENT AND PLACEMENT | WEIGHT % |
|---|---|
| Non-fat dry milk (about 52% by weight lactose) | 1.48 |
| Salt | 0.74 |
| Component 2: second dry feed port | |
| White sugar (sucrose), granulated | 15.55 |
| Brown sugar (about 89% sucrose, 3% invert, 4% non-sugar solids, 3% water) | 7.26 |
| Component 3: first liquid feed port | |
| Soybean spray oil | 22.16 |
| Component 4: second liquid feed port | |
| Tap water | 2.45 |
| Component 5: second dry feed port | |
| Sodium bicarbonate | 0.99 |
| Total | 100.00 |

The components were prepared and fed as in Example 1. The cooker extruder screws were rotated at about 120 rpm at about 1% of maximum torque. The continuous mixer screws were rotated at about 60 rpm at about 19% of maximum torque. The ingredients were fed in their relative amounts to provide a throughput or mass flow rate of the extrudate from the continuous mixer of about 302 lbs/hrs.

On a calculated basis, the water content of the mixture formed in the continuous mixer was about 8.6% by weight, based upon the total weight of the mixture.

At steady state, the barrel set temperatures and the actual barrel temperatures for the cooker extruder were:

| Barrel # | Barrel Set Temperature, °F. | Actual Barrel Temperature, °F. |
|---|---|---|
| 1 | cool | — |
| 2 | 350 | 308 |
| 3 | 350 | — |
| 4 | 350 | 317 |
| 5 | 350 | 346 |
| 6 | 350 | — |
| 7 | 350 | 348 |
| 8 | 350 | 313 |
| 9 | 350 | — |
| 10 | 350 | 346 |
| 11 | 350 | — |
| 12 | 350 | 342 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperature in the extruder at barrels 3, 5, and 11 was about 239° F., 232° F., and 322° F., respectively. The average or median residence time of the ingredients heated in the cooker extruder was about 60-90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The extrudate temperature upon exiting the extruder was about 230° F. The substantially homogeneous dough-like mixture formed in the continuous mixer was extruded from the mixer without a die and resulted in a substantially unleavened extrudate. The dough-like mixture upon exiting the continuous mixer had a temperature of about 106° F.

The dough-like mixture was oily to the touch and did not roll on the rotary molder. A leavenable, rotary moldable dough-like mixture may be produced by reducing the moisture content of the dough-like mixture. The dough-like mixture may then be leavened by subjecting it to microwave energy or dielectric radio frequency heating to obtain distinctly leavened, surface browned cookies having a crumb-like structure and texture.

EXAMPLE 13

Cookies having a crumb-like structure and texture were produced as in Example 10 except: after rotary molding, the pieces were subjected to heating in a continuous 12 kw dielectric radio frequency (27 MHz) oven for about 59 seconds to produce distinctly leavened, surface browned cookies.

EXAMPLE 14

The ingredients, their feed placement, and their relative amounts used to prepare a cookie having a crumb-like structure and texture using extrusion heating, post extrusion mixing, wire cutting and microwave baking in accordance with the present invention were:

| INGREDIENT AND PLACEMENT | WEIGHT % |
|---|---|
| Component 1: first dry feed port | |
| Wheat flour, bleached (about 12% by weight water) | 46.07 |
| Non-fat dry milk (about 52% by weight lactose) | 1.38 |
| Salt | 0.69 |
| Component 2: second dry feed port | |
| White sugar (sucrose), granulated | 14.52 |
| Brown sugar (about 89% sucrose, 3% invert, 4% non-sugar solids, 3% water) | 6.78 |
| Component 3: first liquid feed port | |
| Soybean spray oil | 16.67 |
| Component 4: second liquid feed port | |
| Tap water | 12.96 |
| Component 5: second dry feed port | |
| Sodium bicarbonate | 0.93 |
| Total | 100.00 |

The procedure of Example 1 was followed and the equipment of Example 1 was used in this Example. The cooker extruder screws were rotated at about 130 rpm at about 2% of maximum torque. The continuous mixer screws were rotated at about 60 rpm at about 21% of maximum torque. The ingredients were fed in their relative amounts to provide a throughput or mass flow rate of the dough-like mixture extrudate from the continuous mixer of about 324 lbs/hr.

On a calculated basis, the water content of the dough-like mixture formed in the continuous mixer was about 18.7% by weight, based upon the total weight of the dough-like mixture.

At steady state, the barrel set temperatures and the actual barrel temperatures for the cooker extruder were:

| Barrel # | Barrel Set Temperature, °F. | Actual Barrel Temperature. °F. |
|---|---|---|
| 1 | cool | — |

-continued

| Barrel # | Barrel Set Temperature, °F. | Actual Barrel Temperature. °F. |
|---|---|---|
| 2 | 300 | 281 |
| 3 | 300 | — |
| 4 | 300 | 293 |
| 5 | 300 | 299 |
| 6 | 300 | — |
| 7 | 300 | 301 |
| 8 | 300 | 300 |
| 9 | 300 | — |
| 10 | 300 | 305 |
| 11 | 300 | — |
| 12 | 300 | 300 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperatures in the extruder were about 250° F. at barrel 3, about 240° F. at barrel 5, and about 283° F. at barrel 11. The average or median residence time of the ingredients heated in the cooker extruder was about 60-90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The substantially homogeneous dough-like mixture formed in the continuous mixer was extruded from the mixer without a die and resulted in a substantially unleavened extrudate. The dough-like mixture was immediately transferred to an auger fed wire-cutting machine and was cut into pieces while hot. The diameter of the pieces was about 1 inch.

Six pieces were subjected to microwaving in a microwave oven for about 50 seconds to produce distinctly leavened cookies. The cookies were surface browned and had a crumb-like structure and crumb-like texture.

EXAMPLE 15

Cookies having a crumb-like structure and texture were produced as in Example 14 except: after wire cutting, the pieces were subjected to heating in a continuous 12 kw dielectric radio frequency (27 MHz) oven for about 66 seconds to produce distinctly leavened, surface browned cookies.

What is claimed is:

1. A method for the production of cookies comprising:
   (a) heating ingredients comprising flour, and shortening or fat in a cooker extruder to a temperature of at least about 150° F. to form a heat treated mass,
   (b) reducing the temperature of said heat treated mass,
   (c) admixing water with the heat treated mass to obtain a substantially homogeneous cookie dough-like mixture having a temperature of from about 100° F. to about 212° F.,
   (d) forming the dough-like mixture into pieces, and
   (e) leavening the pieces,
the water being admixed with said heat-treated mass at a pressure and at a heat treated mass temperature which are sufficiently low so as to avoid substantial separation of oil and to avoid extruder surging.

2. A method as claimed in claim wherein said ingredients are heated in said cooker extruder to a temperature of at least about 200° F. to form said heat treated mass.

3. A method as claimed in claim 2 wherein said heat treated mass is cooled in a post extrusion mixer to a temperature of less than about 150° F. so as to avoid substantial separation of oil and to avoid extruder surging.

4. A method as claimed in claim 1 wherein the water content of said dough-like mixture is less than about 15% by weight, based upon the weight of the dough-like mixture.

5. A method as claimed in claim wherein the shortening or fat content of said dough-like mixture is at least about 12% by weight, based upon the weight of the dough-like mixture.

6. A method as claimed in claim 1 wherein the sugar content of said dough-like mixture is at least about 10% by weight crystalline sugar, based upon the weight of the dough-like mixture.

7. A method as claimed in claim 6 wherein said crystalline sugar comprises sucrose.

8. A method as claimed in claim 7 wherein at least one reducing sugar is admixed with said ingredients comprising flour in an amount which promotes Maillard browning.

9. A method as claimed in claim 1 wherein at least one protein source is admixed with said ingredients comprising flour in an amount which promotes Maillard browning.

10. A method as claimed in claim 1 wherein said dough-like mixture comprises:
    (a) less than about 20% by weight water,
    (b) from about 12% by weight to about 40% by weight shortening or fat,
    (c) from about 10% by weight to about 40% by weight of at least one sugar, and
    (d) from about 30% by weight to about 70% by weight of at least one flour,
said percentages being based upon the weight of said dough-like mixture.

11. A method as claimed in claim 1 wherein said heat treated mass is formed at a pressure within the cooker extruder of less than about 10 bars absolute.

12. A method as claimed in claim 11 wherein the average residence time of said ingredients comprising flour at a temperature of at least about 200° F. in said cooker extruder is from about 15 seconds to about 120 seconds.

13. A method as claimed in claim 12 wherein the heat treated mass is admixed with water in a post extrusion mixer and the average residence time of the ingredients in the post extrusion mixer from the point of addition of the added water to the heat treated mass is from about 60 seconds to about 120 seconds.

14. A method as claimed in claim 3 wherein said heat treated mass is cooled to a temperature of less than about 150° F. prior to addition of said water.

15. A method as claimed in claim 1 wherein the temperature of said heat treated mass is reduced by at least about 35° F. prior to said addition of the water to the heat treated mass.

16. A method as claimed in claim 6 wherein at least a portion of said sugar is admixed with the flour and shortening or fat prior to said addition of the water to the heat treated mass.

17. A method as claimed in claim 6 wherein at least a portion of said sugar is subjected to said heating for forming said heat treated mass.

18. A method as claimed in claim 6 wherein at least a portion of said sugar is admixed with the heat treated mass after reducing the temperature of the heat treated mass.

19. A method as claimed in claim 6 wherein at least a portion of said sugar and the water are admixed with said heat-treated mass at a pressure and at a heat treated mass temperature which are sufficiently low so as to avoid substantial separation of oil and to avoid extruder surging.

20. A method as claimed in claim 1 wherein the amount of water admixed with said heat treated mass is from about 0.5% by weight to about 10% by weight, based upon the weight of the dough-like mixture.

21. A method as claimed in claim 20 wherein the water admixed with the heat treated mass comprises a liquid source of water selected from the group consisting of high fructose corn syrup, corn syrup, sucrose syrup, and mixtures thereof.

22. A method for the production of cookies comprising:
(a) heating ingredients comprising flour, and shortening or fat in a cooker extruder to a temperature of at least about 150° F. to form a heat treated mass,
(b) admixing water with the heat treated mass at a heat treated mass temperature of from about 100° F. to about 300° F. to obtain a substantially homogeneous cookie dough-like mixture,
(d) forming the dough-like mixture into pieces, and
(e) leavening the pieces in a post extrusion heater, the water being admixed with said heat-treated mass at a pressure and at a heat treated mass temperature which are sufficiently low so as to avoid substantial separation of oil and to avoid extruder surging.

23. A method as claimed in claim 22 wherein the water content of the dough-like mixture is such that additional water will increase the consistency of the dough-like mixture.

24. A method as claimed in claim 22 wherein said ingredients are heated in said cooker extruder to a temperature of at least about 250° F. to form said heat treated mass.

25. A method as claimed in claim 22 wherein said ingredients are heated in said cooker extruder to a temperature of from about 300° F. to about 500° F. to form said heat treated mass.

26. A method for the production of cookies comprising:
(a) forming a dough-like mixture from ingredients comprising flour, water, at least one sugar, and shortening or fat wherein at least the flour and shortening or fat are heated to a temperature of at least about 150° F. in a cooker extruder,
(b) extruding the dough-like mixture from a post-extrusion mixing device at a temperature of from about 100° F. to about 212° F., and
(c) leavening the pieces in a post extrusion heater.

27. A method as claimed in claim 26 wherein the water content of the dough-like mixture is such that additional water will increase the consistency of the dough-like mixture.

28. A method as claimed in claim 26 wherein said ingredients are heated in said cooker extruder to a temperature of at least about 250° F.

29. A method as claimed in claim 26 wherein said ingredients are heated in said cooker extruder to a temperature of from about 300° F. to about 500° F.

30. A method as claimed in claim 27 wherein said ingredients subjected to said heating in the cooker extruder includes added water.

31. A method as claimed in claim 26 wherein said dough-like mixture is coextruded with a filler material.

32. A method as claimed in claim 1 wherein the shortening or fat content of said dough-like mixture is from about 20% by weight to about 30% by weight, based upon the weight of the dough-like mixture.

33. A method as claimed in claim 22 wherein the shortening or fat content of said dough-like mixture is from about 20% by weight to about 30% by weight, based upon the weight of the dough-like mixture.

34. A method as claimed in claim 26 wherein the shortening or fat content of said dough-like mixture is from about 20% by weight to about 30% by weight, based upon the weight of the dough-like mixture.

* * * * *

UNITED STATES PATENT AND TRADEMARK OFFICE
CERTIFICATE OF CORRECTION

PATENT NO. : 5,015,488
DATED : May 14, 1991
INVENTOR(S) : Bernhard van Lengerich, et al It is certified that error appears in the above-indentified patent and that said Letters Patent is hereby corrected as shown below:

```
Please add the following disclaimer to the patent:

--The portion of the term of this patent subsequent
  to March 12, 2008 has been disclaimed.--
```

Signed and Sealed this

Twenty-fifth Day of January, 1994

Attest:

BRUCE LEHMAN

*Attesting Officer*  *Commissioner of Patents and Trademarks*